Patented Aug. 25, 1942

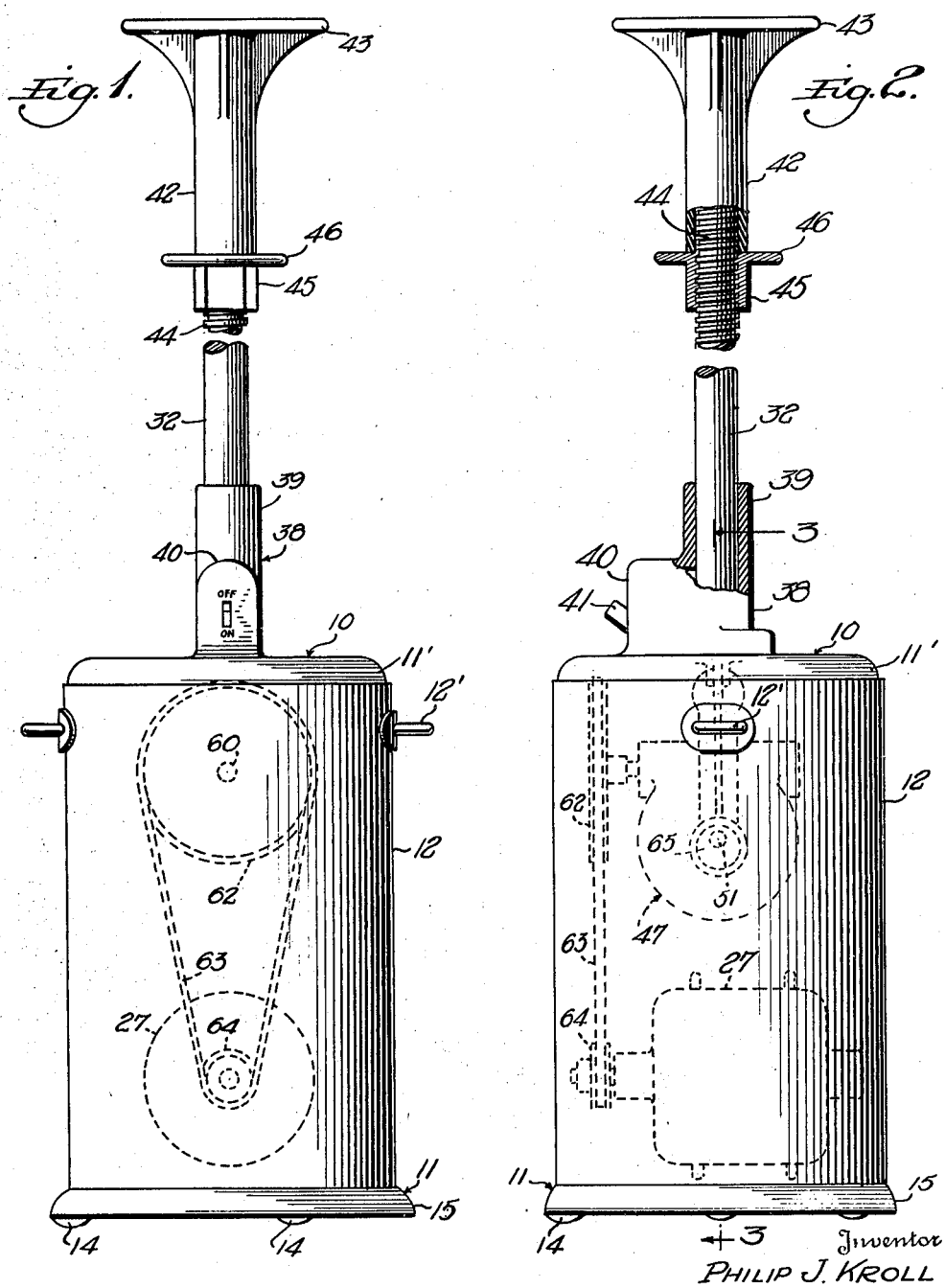

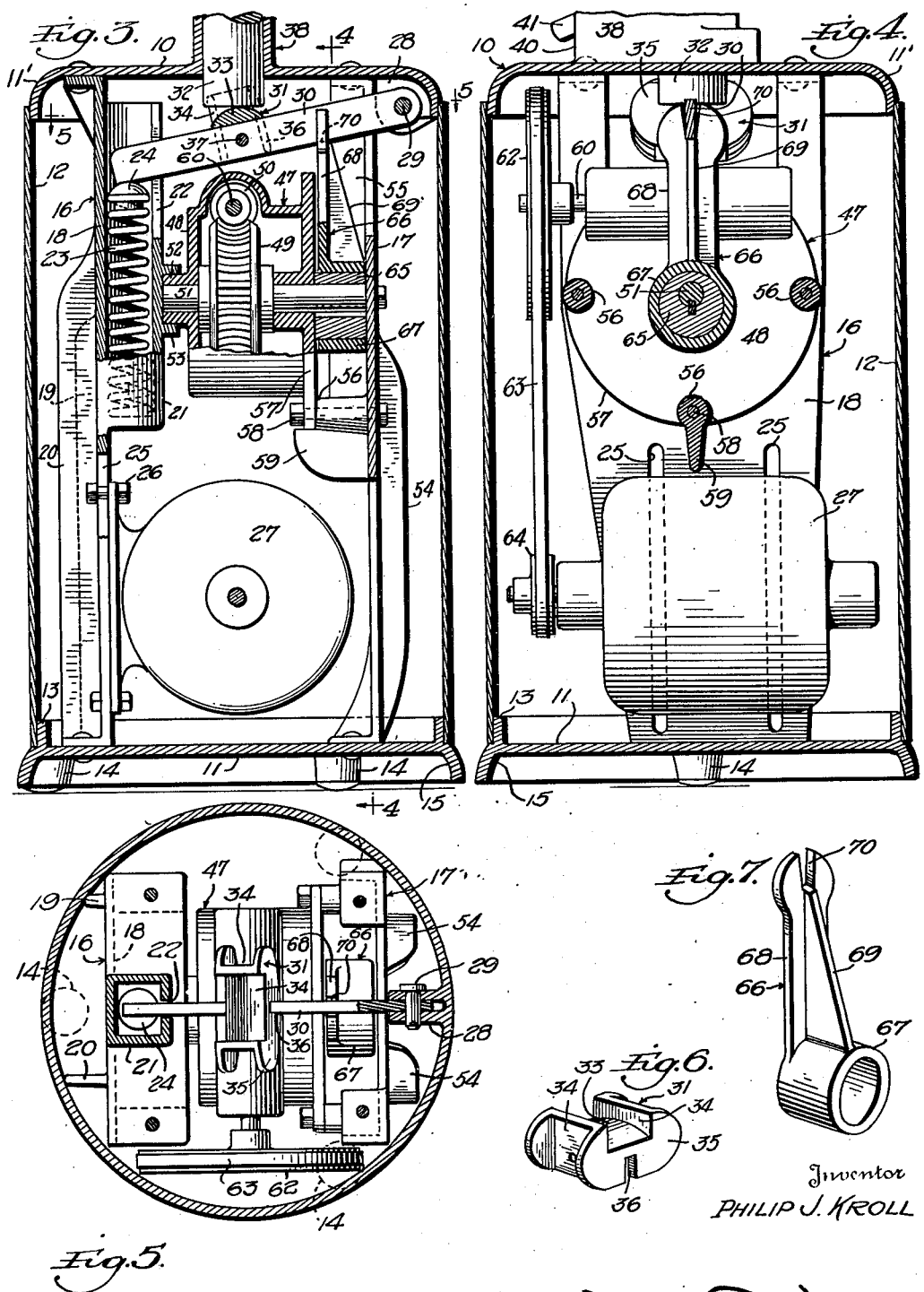

2,293,832

UNITED STATES PATENT OFFICE 2,293,832

VEHICLE ROCKING APPARATUS

Philip J. Kroll, New Orleans, La.

Application March 18, 1940, Serial No. 324,680

15 Claims. (Cl. 73—51)

This invention relates to a vehicle rocking apparatus.

Numerous forms of apparatus have been devised for rocking the frames of motor vehicles to facilitate the lubrication of the springs, shackle bolts, etc., the rocking motion during the lubricating operations serving to cause the lubricant to be fed to all of the parts to be lubricated. The rocking operation moreover facilitates the location of squeaks in the motor vehicle. Most of such prior mechanisms have employed the use of two vehicle engaging devices such as jack posts respectively engageable beneath the side members of the vehicle frame, and such mechanisms have means for alternately vertically reciprocating the jack posts to rock the vehicle body. Such a mechanism is highly advantageous in use but possesses certain disadvantages under some conditions and in some instances. For example, the apparatus is fairly large in size and accordingly requires substantial space for its storage. In the second place, it is sufficiently high in price to prevent its general use in small motor vehicle service stations.

An important object of the present invention is to provide a compact simplified form of vehicle rocking mechanism which occupies a minimum storage space, and which, because of its size, is more readily portable than the types of rocking mechanisms referred to above.

A further object is to provide a novel mechanism of the type referred to which is substantially cheaper to manufacture than the prior types of rocking mechanisms referred to, thus making it practicable for use in small service stations.

A further object is to provide such a mechanism wherein a single vehicle engaging element is employed through which a force is transmitted to only one side of the vehicle frame to effect the rocking operation.

A further object is to provide novel means for at least partially counterbalancing the weight of the vehicle body to reduce the power necessary for the operation of the apparatus, thus permitting the use of a relatively small motor.

A further object is to provide a novel assembly of elements through which one side of a vehicle frame is moved upwardly and downwardly to rock the vehicle body, and wherein the parts are completely housed but are readily accessible to be serviced or lubricated.

Other objects and advantages of the invention will become apparent during the course of the following description.

In the drawings I have shown one embodiment of the invention. In this showing:

Figure 1 is an elevation of the apparatus,

Figure 2 is a similar view taken at right angles to Figure 1, parts being shown in section and parts being broken away, Figure 3 is a vertical sectional view on line 3—3 of Figure 2, parts being broken away and parts being shown in elevation, Figure 4 is a vertical sectional view on line 4—4 of Figure 3, Figure 5 is a horizontal sectional view on line 5—5 of Figure 3, Figure 6 is a detail perspective view of the jack post engaging member, and, Figure 7 is a similar view of an operating member for transmitting rocking movement to the actuating lever.

Referring to the drawings, the numerals 10 and 11 designate upper and lower castings forming portions of the supporting frame for the apparatus. The upper casting 10 is provided with a downturned peripheral flange 11' receivable in the upper end of a shell 12 forming a closure for the mechanism, the lower end of this shell fitting over a flange 13 carried by the lower casting 11. The shell 12 may be provided with suitable handles 12' to facilitate its removal from the apparatus. The apparatus is supported preferably by three knobs 14 formed integral with and depending from the lower casting 11, these three points of engagement with the surrounding surface permitting the apparatus to seat solidly wherever placed. The lower casting 11 is provided with a depending skirt portion 15 which substantially conceals the knobs 14 but has its lower end terminating above the bottom of the knobs 14 so as not to engage the supporting surface on which the apparatus rests.

The main supporting frame members for the apparatus are in the form of vertically extending castings 16 and 17 the upper and lower ends of which are respectively secured to the castings 10 and 11. The supporting frame 16 comprises a vertical plate 18 arranged parallel to the axis of the shell 12 and provided with suitable reinforcing ribs 19 and 20, these ribs being as wide as can be accommodated within the shell 12, as shown in Figure 5. The frame member 16 further includes an integral housing 21 of which the plate 18 forms one side, and the opposite side of such housing is vertically slotted as at 22 for a purpose to be described. A relatively heavy compression spring 23 is arranged within the housing 21 and is provided at its upper end with a bearing button 24.

The supporting frame 16 has the lower end portion of the plate 18 thereof vertically slotted as at 25 to receive bolts for securing a motor 27 to the plate 18, it being apparent that this plate forms the sole support for the motor. The motor drives the mechanism in a manner to be referred to and is vertically adjustable by means of the arrangement of the bolts 26 in the slots 25.

The casting 10 is provided with depending lugs 28 (Figure 3) carrying a shaft 29 pivotally supporting an actuating lever 30. The end of the lever 30 opposite its pivot 29 extends through the slot 22 and rests upon the bearing button 24. A jack post operating member 31, shown in detail in Figure 6, is adapted to transmit movement from the lever 30 to the lower end of a jack post 32. The member 31 comprises a central arcuate portion 33 engageable with the lower end of the jack post and is provided with upstanding opposite wall portions 34 embracing the lower end of the jack post for a purpose to be described. At right angles to the wall 34 the member 31 is further provided with end walls 35 which are slotted as at 36 to receive the lever 30, the member 31 being secured to such lever by a suitable pin or bolt 37.

The casting 10 is provided with an upstanding integral portion indicated by the numeral 38, the upper end of such portion forming a bearing 39 of cylindrical shape slidably receiving the jack post 32. The lower end of the enlarged portion 38 extends laterally at one side of the jack post as at 40 to form a housing for a control switch (not shown) for the motor 27, this switch being operable by a suitable handle 41. Because of the laterally extending portion 40, the enlargement 38 does not completely surround the jack post at the lower end of such enlargement, and guiding of the jack post in its vertical reciprocatory movement is assisted by the arrangement of the lower end of the jack post between the walls 34 of the actuating member 31. The lever 30, in turn, is prevented from partaking of lateral movement by the arrangement of the ends of such lever between the lugs 28 and between the edges of the slot 22.

A sleeve 42 slidably surrounds the upper end of the jack post and is provided at its upper end with a vehicle engaging head 43. The upper end of the jack post is threaded as at 44 and a collar 45 is threaded thereon and is provided with a flange portion 46 forming a hand wheel. This wheel or the portion of the collar 45 therebelow may be engaged by a suitable tool, such as a wrench, after the member 43 has been engaged with one of the vehicle frames and the frame is to be elevated, prior to the operation of the apparatus, as will be explained in detail later.

Novel mechanism is employed for transmitting power from the motor 27 to the lever 30 to rock the latter and thus reciprocate the jack post 32. A speed reduction unit indicated as a whole by the numeral 47 is arranged between the frame members 16 and 17 and comprises a housing 48 in which is arranged a worm wheel 49 engaged by a worm 50. The housing 48 is provided with a shaft 51 mounted in bearings formed by the housing 48, one of such bearings indicated by the numeral 52 extending laterally from the housing and being received in a cylindrical boss 53 formed integral with the adjacent wall of the housing 21. Through such arrangement, the load at one side of the speed reduction unit is carried directly by the frame member 16.

The frame member 17 carries the load at the opposite side of the speed reduction unit. As shown in Figures 3 and 5, the frame member 17 is provided with suitable outside integral reinforcing ribs 54 which preferably terminate below the axis of the worm wheel 49. From a point below such axis to the top of the frame member 17, the latter is provided with inside integral reinforcing ribs 55. The frame member 17 is also provided with a plurality of bosses 56 which extend inwardly beyond the ribs 55 and engage against the adjacent face of the housing 48. The adjacent side of such housing is flanged as at 57 to receive bolts 58 which extend through the bosses 56. Thus the speed reduction unit is effectively secured to the frame member 17. The bolts 58, however, are not intended to carry the load of the speed reduction unit, the frame member 17 being provided with an inwardly extending relatively heavy integral lug 59 engaging the lower edge of the flange 57 to carry the load referred to.

The worm 50 is carried by a shaft 60 (Figures 3 and 4) journaled in lateral extensions 61 carried by the casing 48, and one end of such shaft carries a pulley 62. A belt 63 passes around this pulley, which is relatively large, and around a smaller pulley 64 carried by the shaft of the motor 27.

The shaft 51 is provided externally of the casing 48 with an eccentric cam 65 keyed or otherwise secured thereto. A vertical operating connection 66 is provided at its lower end with a cylindrical collar 67 receiving the cam 65. The connection 66 includes an upwardly extending arm portion 68, suitably reinforced by an integral rib 69, and the upper end of the arm 68 is slotted at as 70 to receive the lever 30. With such arrangement it is obvious that rotation of the shaft 51 will transmit movement to the lever 30 to rock the latter and thus vertically reciprocate the jack post 32.

The operation of the apparatus is as follows:
The speed reduction unit 47 is secured by the bolts 58 to the frame member 17. The motor 27 is secured by the bolts 26 to the frame member 16. The two frame members are then bolted or otherwise secured to the bottom casting 11, and the bearing 52 (Figure 3) will be received in the boss 53. The spring 23 is placed in the housing 21, whereupon the upper casting 10, with the lever 30 pivotally connected to the pin 29, is bolted to the upper ends of the frame members 16 and 17. With the parts so assembled, the belt 63 is placed in position around the pulleys 62 and 64, whereupon the motor 27 may be vertically adjusted to properly tension the belt 63 by fastening the bolts 26.

The shell 12 is then moved downwardly into position to cover the working parts of the apparatus. In this connection it will be noted that the shell 12 need not be secured in position, the shell having a sliding fit over the flanges 11 and 13. Thus it will be apparent that this shell is readily removable at any time to provide access to the different parts of the apparatus whenever it is desired to service or lubricate such parts. It will be apparent that the lower end of the jack post is slidable in the bearing 39, and as soon as the jack post is set in position, the apparatus is ready for operation.

The sleeve 42 is normally arranged approximately in the position shown in Figure 2 with respect to the jack post. At the same time, the lever 30 will be supported in its upper most position by the uncompressed spring 23. Under such conditions the head 43 will be in such position that it may be readily moved into position beneath one of the side frame members of a motor vehicle. When it is desired to rock the body of the vehicle the apparatus is placed in position with the head 43 beneath one of the frame members, whereupon the operator may slip the head 43 upwardly into engagement with the frame member, hold the head 43 in such position, and then spin the wheel 46 to move it upwardly into engagement with the lower end of the sleeve 42. It will be apparent that the spring 23 is normally free of compression and accordingly the lever 30 is normally arranged in a position with its lower edge above the bottom of the notch 70 (Figure 3). When the head 43 is engaged with a vehicle frame in the manner described, therefore, the operator may apply a wrench to the sleeve 45 or wheel 46 to rotate it upwardly, thus elevating the adjacent side of the vehicle frame and at the same time forcing the jack post 32 downwardly against the tension of the spring 23.

Accordingly the spring 23 will be loaded prior to the operation of the apparatus and will carry a substantial portion of the weight of the vehicle body resting upon the head 43. The switch handle 41 is now moved to start the motor 27. Operation of the motor drives the shaft 60 through the belt 63 to rotate the worm 50 which, in turn, rotates the worm wheel 49 and cam 65 to vertically reciprocate the actuating member 66. This operation forces the lever 30 to swing upwardly upon each upward movement of the actuating member 66, and upon each downward movement of such member, the weight of the vehicle body will move the jack post 32 and lever 30 downwardly. This operation is automatically continued as long as desired, the vertical reciprocation of the jack post transversely rocking the vehicle body whereby lubricant being supplied to parts of the vehicle such as the spring and shackle bolts will work its way along all of the surfaces to be lubricated. As soon as the operation is completed the motor 27 will be stopped, whereupon the operator will apply a wrench to the sleeve 45 or wheel 46 to turn the sleeve downwardly until no load is imposed on the head 43, whereupon the wheel 46 may be manually rotated to permit the head 43 to move downwardly to its normal position. The apparatus then may be removed from beneath the vehicle and stored wherever desired.

As previously stated, the vehicle rocking mechanisms commonly in used provide two jack posts which are engageable with the respective side frame members of a motor vehicle. These jack posts are simultaneously and opposely reciprocated from a power source which may be in the form of a relatively small motor for the reason that the weights of opposite sides of the vehicle frame balance the loads so that very little power is required for the rocking operation. In a type of vehicle rocking apparatus wherein only one side of the vehicle frame is vertically moved there are no balancing loads and accordingly more power is commonly required for the operation of such an apparatus than is true in the case of the conventional apparatus having jack posts engaging opposite sides of the vehicle frame.

The difficulty referred to is overcome with the present apparatus. The spring 23 is not normally compressed, but when the apparatus is placed in operation the turning upwardly of the sleeve 45 by a suitable wrench loads the spring 23, thus providing a counterbalancing force which will balance at least a substantial portion of the load of the vehicle body imposed on the jack post 32. Less force accordingly is required for moving the jack post to its upper limit of movement, and upon downward movement of the jack post, energy is stored in the spring 23, which energy is expended on the next upstroke of the jack post 32. Accordingly the present apparatus is wholly practicable with the use of a relatively small motor.

The apparatus is relatively small and compact and thus may be stored in a relatively small space. The use of the device is thus more convenient in small service stations, and because of its relatively small size, the apparatus is more readily portable than larger vehicle rocking mechanisms. The assembly of the device is simple and easy and the frame members 16 and 17 adequately carry the loads imposed thereon. The lever 30 is effectively guided in its vertical movement by the lugs 28 and the edges of the slots 22, thus preventing any lateral movement of the lever 30 and permitting the latter, through the walls 34 of the actuating member 31, to assist in guiding the jack post 32.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Vehicle rocking apparatus comprising a supporting structure, a vertically reciprocable jack post having a vehicle engaging head at its upper end, guide means for supporting said jack post for vertical sliding movement with respect to said supporting structure, a lever pivotally connected to said supporting structure and connected and arranged to exert an upward force against the lower end of said jack post to vertically reciprocate the latter, a motor, motion transmitting means below said lever connecting said motor to said lever to effect rocking movement thereof, and means below said lever for exerting an upward force against said lever remote from the pivot thereof independently of said motion transmitting means to support at least a portion of the load imposed on said jack post.

2. Vehicle rocking apparatus comprising a supporting structure, a vertically reciprocable jack post having a vehicle engaging head at its upper end, guide means for supporting said jack post for vertical sliding movement with respect to said supporting structure, a lever pivotally connected to said supporting structure and connected and arranged to exert an upward force against the lower end of said jack post to vertically reciprocate the latter, a motor, motion transmitting means connecting said motor to said lever to effect rocking movement thereof, and a compression spring carried by said supporting structure below said lever and having its upper end engaging said lever remote from its pivot to resiliently support at least a portion of the load imposed on said jack post.

3. Vehicle rocking apparatus comprising a supporting structure, a vertically reciprocable jack post slidable with respect to said supporting structure and having a vehicle engaging head at its upper end, a lever pivotally connected to said supporting structure and connected and arranged to exert an upward force against the lower end of said jack post to vertically reciprocate the latter, a motor, motion transmitting means connecting said motor to said lever to effect rocking movement thereof, and a compression spring carried by said supporting structure and having its upper end engaging said lever remote from its pivot to resiliently support at least a portion of the load imposed on said jack post, said jack post having adjusting means for moving the head thereof upwardly to increase the force exerted by said head against a vehicle frame.

4. Vehicle rocking apparatus comprising a vertical jack post, a supporting structure having a portion engaging said jack post to guide it for vertical reciprocatory movement, a lever pivotally supported at one end by said supporting structure for rocking movement on a horizontal axis, said lever having a portion intermediate its ends arranged to transmit rocking movement of the lever to said jack post to vertically reciprocate the latter, and a vertical compression spring carried by said supporting structure and having its upper end arranged beneath the free end of said lever to exert an upward force thereagainst to at least partly support the load imposed on said jack post, said supporting structure having a portion engaging said lever to guide it for vertical movement.

5. Vehicle rocking apparatus comprising a vertical jack post, a supporting structure having a portion engaging said jack post to guide it for vertical reciprocatory movement, a lever pivotally supported at one end by said supporting structure for rocking movement on a horizontal axis, said lever having a portion intermediate its ends arranged to transmit rocking movement of the lever to said jack post to vertically reciprocate the latter, and a vertical compression spring carried by said supporting structure and having its upper end arranged beneath the free end of said lever to exert an upward force thereagainst to at least partly support the load imposed on said jack post, said supporting structure having a portion engaging said lever to guide it for vertical movement, said jack post having a sleeve slidable on the upper end thereof and provided at its upper end with a vehicle frame engaging element, and an adjusting sleeve threaded on said jack post and having its upper end engaging the lower end of said first named sleeve whereby rotation of said second named sleeve varies the pressure of said vehicle frame engaging element upwardly against the vehicle frame.

6. Vehicle rocking apparatus comprising a pair of spaced upstanding supporting structures, a speed reducing unit mounted between and supported by said structures, a motor connected to drive said unit, a lever pivotally connected to one of said supporting structures to rock in a vertical plane, means connecting said speed reducing unit to said lever to effect rocking movement thereof, a jack post having a vehicle frame engaging element at its upper end, said jack post having its lower end arranged to be moved vertically by said lever, and means carried by one of said supporting structures and independent of said motor and said speed reducing unit for carrying at least a portion of the load imposed on said jack post.

7. Vehicle rocking apparatus comprising a pair of spaced upstanding supporting structures, a speed reducing unit mounted between and supported by said structures, a motor connected to drive said unit, a lever pivotally connected to one of said supporting structures to rock in a vertical plane, means connecting said speed reducing unit to said lever to effect rocking movement thereof, a jack post having a vehicle frame engaging element at its upper end, said jack post having its lower end arranged to be moved vertically by said lever, and resilient means carried by one of said supporting structures and having its upper end arranged to engage said lever to support at least a portion of the load imposed thereon through said jack post.

8. Vehicle rocking apparatus comprising a pair of spaced upstanding supporting structures, a speed reducing unit mounted between and supported by said structures, a motor connected to drive said unit, a lever pivotally connected to one of said supporting structures to rock in a vertical plane, means connecting said speed reducing unit to said lever to effect rocking movement thereof, a jack post having a vehicle frame engaging element at its upper end, said jack post having its lower end arranged to be moved vertically by said lever, a housing carried by one of said supporting structures, and a vertical compression spring arranged in said housing and having its upper end contacting with said lever to carry at least a portion of the load imposed on said lever through said jack post.

9. Vehicle rocking apparatus comprising a pair of spaced upstanding supporting structures, a speed reducing unit mounted between and supported by said structures, a motor connected to drive said unit, a lever mounted to rock in a vertical plane, means connecting said speed reducing unit to said lever to effect rocking movement thereof, a jack post having a vehicle frame engaging element at its upper end, said jack post having its lower end arranged to be moved vertically by said lever, a housing carried by one of said supporting structures, and a vertical compression spring arranged in said housing and having its upper end contacting with said lever to carry at least a portion of the load imposed on said lever through said jack post, said jack post being constructed and arranged whereby the vehicle frame engaging element thereof is vertically adjustable to vary its upward pressure against a vehicle frame.

10. Vehicle rocking apparatus comprising a vertical jack post mounted for vertical reciprocation, a lever supported for rocking movement in a vertical plane and arranged to effect upward movement of said jack post upon upward movement of said lever, an actuating member vertically arranged beneath said lever with its upper end engaging said lever to effect rocking movement thereof, means for effecting vertical movement of said actuating member, and spring means arranged below and engaging said lever to support at least a part of the load imposed thereon through said jack post.

11. Vehicle rocking apparatus comprising a vertical jack post mounted for vertical reciprocation, a lever supported for rocking movement in a vertical plane and arranged to effect upward movement of said jack post upon upward movement of said lever, a vertically arranged actuating member having a slot in its upper end receiving said lever, said actuating member having a horizontal bearing in its lower end, a rotatable eccentric arranged in said bearing and operative upon rotation to effect vertical reciprocation of said actuating member to rock said lever, and a compression spring engaging said lever to carry at least a portion of the load imposed thereon through said jack post.

12. Vehicle rocking apparatus comprising a jack post supported for vertical reciprocatory motion and provided at its upper end with a vehicle frame engaging element, a lever pivoted on a horizontal axis for swinging movement in a common vertical plane with said jack post, means comprising a motor for swinging said lever, resilient means engaging said lever to support at least a portion of the load imposed thereon through said jack post, and a motion transmitting element mounted on the top of said lever and having an upper bearing surface engageable with the lower end of said jack post to transmit motion from said lever to said jack post, said motion transmitting element having portions extending upwardly adjacent the sides of said jack post to assist in guiding the latter for vertical movement.

13. Vehicle rocking apparatus comprising a supporting structure, a jack post supported for vertical reciprocatory motion and provided at its upper end with a vehicle frame engaging element, a lever pivoted on a horizontal axis for swinging movement in a common vertical plane with said jack post, means comprising a motor for swinging said lever, a vertical socket carried by said supporting structure, a vertical compression spring mounted in said socket, one wall of said socket having a vertical slot through which said lever projects to rest upon said spring whereby the latter supports at least a portion of the load imposed on said lever through said jack post, the sides of said slot guiding said lever for vertical swinging movement, and a motion transmitting element mounted on the top of said lever and having an upper surface engageable with the lower end of said jack post to transmit motion from said lever to said jack post, said motion transmitting element having portions extending upwardly adjacent the sides of said jack post to assist in guiding the latter for vertical movement.

14. A vehicle rocking apparatus comprising a vertical jack post having a vehicle engaging element at its upper end, a generally horizontally arranged lever beneath said jack post, means pivotally supporting said lever adjacent one end thereof, said lever intermediate its ends having mechanical connection with the lower end of said jack post, a compression spring arranged beneath the free end of said lever and having its upper end engaging such end of the lever to tend to move the latter upwardly, an actuating member arranged beneath said lever and having its upper end engaging said lever at a point spaced from the pivot thereof, and means for operating said actuating member to rock said lever.

15. A vehicle rocking apparatus comprising a vertical jack post having a vehicle engaging element at its upper end, a generally horizontally arranged lever beneath said jack post, means pivotally supporting said lever adjacent one end thereof, said lever intermediate its ends having mechanical connection with the lower end of said jack post, a compression spring arranged beneath the free end of said lever and having its upper end engaging such end of the lever to tend to move the latter upwardly, an actuating member arranged beneath said lever and having its upper end engaging said lever at a point spaced from the pivot thereof, means for operating said actuating member to rock said lever, and means for varying the length of said jack post to vary the loading of said spring when said vehicle engaging element is engaged beneath a portion of a vehicle.

PHILIP J. KROLL.